(12) United States Patent
Gill

(10) Patent No.: US 6,414,826 B1
(45) Date of Patent: *Jul. 2, 2002

(54) HIGH SENSITIVITY AP PINNED HEAD

(75) Inventor: Harry S. Gill, Portola Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/507,132

(22) Filed: Feb. 18, 2000

(51) Int. Cl.⁷ ................................................. G11B 5/39
(52) U.S. Cl. .................................. 360/324.12; 360/319
(58) Field of Search ........................... 360/319, 324.11, 360/324.12

(56) References Cited

U.S. PATENT DOCUMENTS

| | | | | |
|---|---|---|---|---|
| 5,696,656 A | * | 12/1997 | Gill et al. | 360/319 |
| 5,850,325 A | * | 12/1998 | Miyauchi et al. | 360/319 |
| 5,898,548 A | * | 4/1999 | Dill et al. | 360/324.2 |
| 6,061,210 A | * | 5/2000 | Gill | 360/319 |
| 6,198,609 B1 | * | 3/2001 | Barr et al. | 360/322 |
| 6,243,241 B1 | * | 6/2001 | Kanai | 360/324.11 |

* cited by examiner

Primary Examiner—Jefferson Evans
(74) Attorney, Agent, or Firm—Blakely, Sokoloff, Taylor & Zafman

(57) ABSTRACT

An apparatus is disclosed having a free layer and a spacer layer. The spacer layer is between a first magnetic layer and the free layer where the spacer layer and first magnetic layer are tailored to produce a coupling bias on the free layer. A conductive layer is between a second magnetic layer and the first magnetic layer. The first and second magnetic layers are magnetized antiparallel with respect to each other. The first and second magnetic layers and the spacer and conductive layers are tailored to produce a pole density bias on the free layer. The apparatus also has a pair of shields. The free layer is located at a position between the shields such that an image bias and a sensor current bias, in summation with the coupling bias and the pole density bias, produce negligible bias on the magnetization direction of the free layer.

22 Claims, 5 Drawing Sheets

HIGH SENSITIVITY AP PINNED HEAD

FIELD OF THE INVENTION

The field of invention relates to direct access data storage, generally. More specifically, the invention relates to compensating for the effect of image current within an AP Pinned magnetic heads.

BACKGROUND

Hardware systems often include memory storage devices having media on which data can be written to and read from. A direct access storage device (DASD or disk drive) incorporating rotating magnetic disks are commonly used for storing data in magnetic form. Magnetic heads, when writing data, record concentric, radially spaced information tracks on the rotating disks. Magnetic heads also typically include read sensors that read data from the tracks on the disk surfaces.

In high capacity disk drives, magnetoresistive (MR) read sensors, the defining structure of MR heads, can read stored data at higher linear densities than thin film heads. A MR head detects the magnetic field(s) through the change in resistance of its MR sensor. The resistance of the MR sensor changes as a function of the direction of the magnetic flux that emanates from the rotating disk.

One type of MR sensor, referred to as a giant magnetoresistive (GMR) effect sensor, takes advantage of the GMR effect. In GMR sensors, the resistance of the MR sensor varies with direction of flux from the rotating disk and as a function of the spin dependent transmission of conducting electrons between magnetic layers separated by a non-magnetic layer (commonly referred to as a spacer) and the accompanying spin dependent scattering within the magnetic layers that takes place at the interface of the magnetic and non-magnetic layers.

GMR sensors using two layers of magnetic material separated by a layer of GMR promoting non-magnetic material are generally referred to as spin valve (SV) sensors. In an SV sensor, one of the magnetic layers, referred to as the pinned layer, has its magnetization direction "pinned" via the influence of exchange coupling with an antiferromagnetic layer. Due to the relatively high internal anisotropy field associated with the pinned layer, the magnetization direction of the pinned layer typically does not rotate from the flux lines that emanate from the rotating disk. The magnetization direction of the other magnetic layer (commonly referred to as a free layer), however, is free to rotate with respect to the flux lines that emanate from the rotating disk.

FIG. 1 shows a prior art SV sensor structure 100 where the pinned layer is implemented as a structure 120 having two ferromagnetic films 121, 122 (also referred to as MP2 and MP1 layers, respectively) separated by a conductive film 123 (such as ruthenium Ru) that provides antiparallel coupling of the two ferromagnetic films 121, 122. Sensor structures such as that 100 shown in FIG. 1 are referred to as AP sensors in light of the antiparallel magnetic relationship between films 121, 122. Similarly, structure 120 may also be referred to as an AP layer 120.

FIG. 1 shows an AP sensor 100 comprising a seed layer 102 formed upon a gap layer 101. The seed layer 102 helps properly form the microstructure of the antiferromagnetic layer 105. Over seed layer 102 is an antiferromagnetic (AFM) 105 layer used to pin the magnetization direction of the MP2 layer 121. MP1 layer 122 is separated from free layer 103 by spacer layer 104. Note that free magnetic layer 103 may be a multilayer structure having two or more magnetic layers.

A problem with structures such as or similar to that shown in FIG. 1 is the net bias exerted on the free layer 103 by the other layers and/or currents associated with the sensor 100.

SUMMARY OF INVENTION

An apparatus is described comprising a free layer and a spacer layer. The spacer layer is between a first magnetic layer and the free layer where the spacer and first magnetic layers are tailored to produce a coupling bias on the free layer. A conductive layer is between a second magnetic layer and the first magnetic layer. The first and second magnetic layers are magnetized antiparallel with respect to each other. The first and second magnetic layers and the spacer and conductive layers are tailored to produce a pole density bias on the free layer. The apparatus also has a pair of shields. The free layer is located at a position between the shields such that an image bias and a sensor current bias, in summation with the coupling bias and the pole density bias, produce negligible bias on the magnetization direction of the free layer.

BRIEF DESCRIPTION OF THE DRAWINGS

The present invention is illustrated by way of example, and not limitation, in the Figures of the accompanying drawings in which:

FIG. 2b shows the magnetic field biases on the free layer of FIG. 2a.

DETAILED DESCRIPTION

An apparatus is described having a free layer and a spacer layer. The spacer layer is between a first magnetic layer and the free layer where the spacer and first magnetic layers are tailored to produce a coupling bias on the free layer. A conductive layer is between a second magnetic layer and the first magnetic layer. The first and second magnetic layers are magnetized antiparallel with respect to each other. The first and second magnetic layers and the spacer and conductive layers are tailored to produce a pole density bias on the free layer. The apparatus also has a pair of shields. The free layer is located at a position between the shields such that an image bias and a sensor current bias, in summation with the coupling bias and the pole density bias, produce negligible bias on the magnetization direction of the free layer.

These and other embodiments of the present invention may be realized in accordance with the following teachings and it should be evident that various modifications and changes may be made in the following teachings without departing from the broader spirit and scope of the invention.

The specification and drawings are, accordingly, to be regarded in an illustrative rather than restrictive sense and the invention measured only in terms of the claims.

Figure 1:
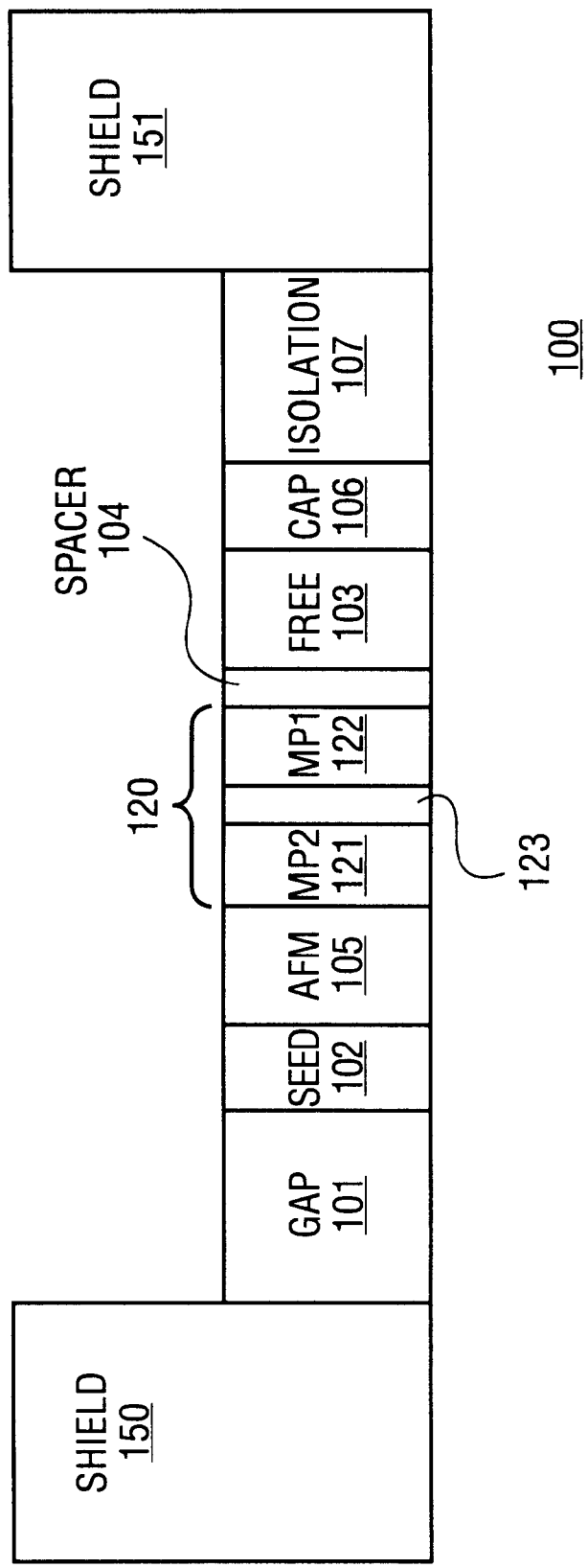
FIG. 1 (prior art) shows an AP pinned magnetic recording head sensor.
Figure 2A:
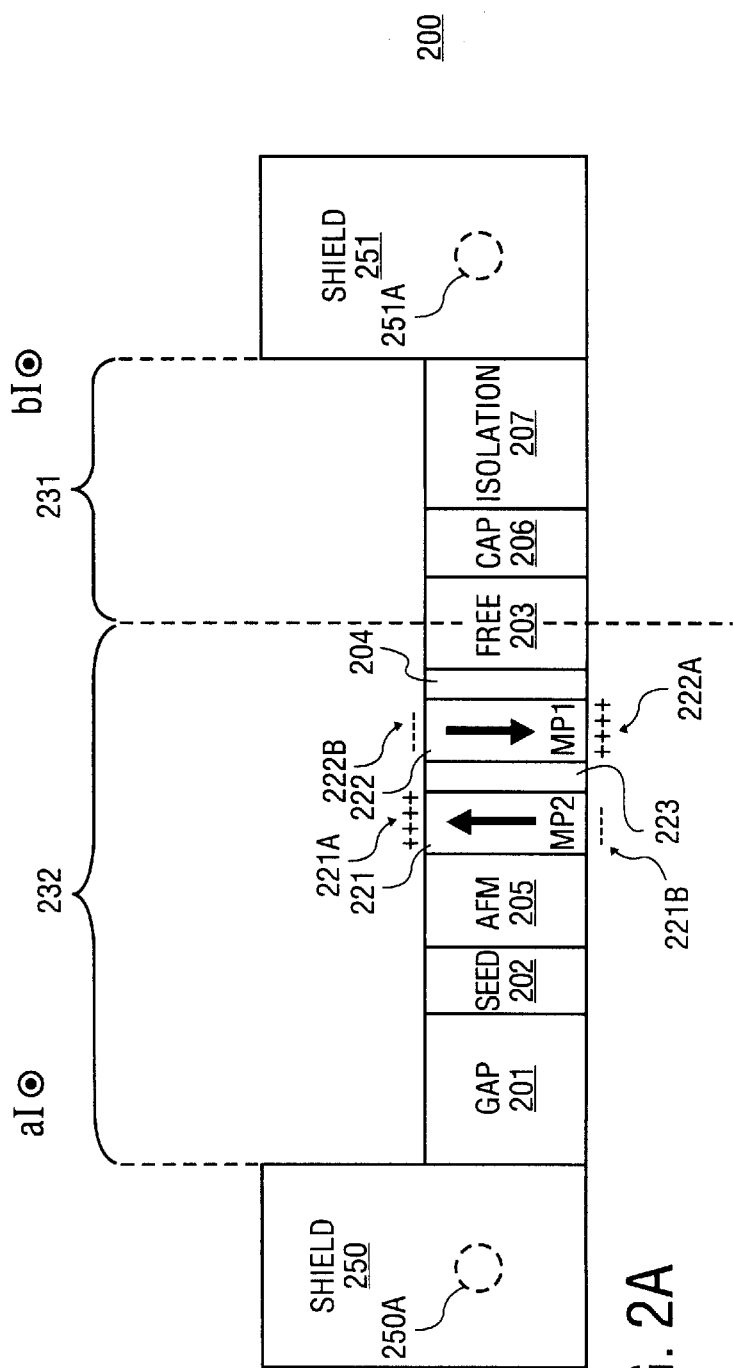
FIG. 2a shows the AP magnetic recording head sensor of FIG. 1 including the sources of magnetic field biasing on the free layer.

FIG. 2a shows the AP pinned magnetic recording head sensor 200 of FIG. 1 including the sources of magnetic field biasing on the free layer 203. Recall from the background that the resistance of the MR sensor 200 varies with the direction of flux from the rotating disk. The variation in resistance is due to the change in magnetization direction of the free layer 203 which, as described, is free to rotate with respect to the flux lines that emanate from the rotating disk.

Referring to FIG. 2a, since the disk lies in the xy plane, the flux lines emanating from the disk have a component in the +z or −z direction (depending upon the magnetization directions of the data as stored within the disk). The magnetization direction of the free layer 203 should lie substantially along the x axis so that the free layer 203 exhibits a balanced response to the flux components directed in the +z or −z directions.

If the free layer 203 is balanced, a flux component in the +z direction will produce approximately the same magneto resistance through the free layer 203 as another flux component in the −z direction (where the magnitude of both flux components is the same). Thus, having a balanced free layer 203 magnetization direction allows for enhanced output signal swing which corresponds to enhanced sensitivity of the sensor 200.

In order to balance the free layer 203, the net bias on the free layer 203 should be approximately zero. If the net bias on the free layer is approximately zero, the magnetization direction of the free layer 203 may be determined by fabrication conditions. That is, fabrication conditions can form the free layer 203 with a crystalline orientation that promotes a magnetization direction along the x axis. The net bias on the free layer 203 may be viewed as the overall effect from a number of different sources inherent in the sensor structure 200 that influence (i.e, bias) the direction of the free layer 203 magnetization.

Figure 2B:
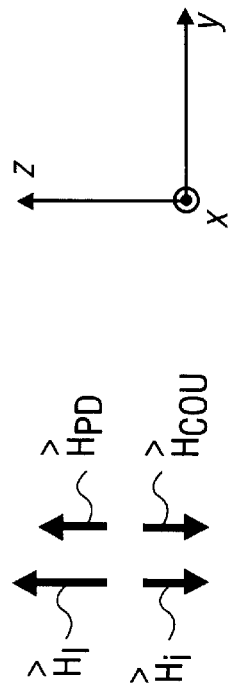

The sources that inherently affect the magnetization direction of the free layer 203 are shown in FIG. 2a. The biases exerted upon the free layer 203 magnetization for each source are shown in FIG. 2b. The sensor current bias $H_I$ is produced by the current that flows through the sensor structure 200. The sensor current is used to produce the output signal (a voltage) which fluctuates with the change in resistance through the free layer 203. Since most of the structure's various layers are conductive (excluding the gap 201 layer, isolation layer 207 layer and in some cases the seed layer 202 which are typically an oxide), the sensor current passes through most of the sensor 200.

In FIG. 2b the sensor current is in the +x direction. Note also that the free layer 203 is typically not centered within the sensor structure 200. For example, as seen in FIG. 2b, the free layer 203 is closer to shield 251 than shield 250. Thus, the sensor current may be viewed as passing through two portions of the sensor 200. A first portion 232 from shield 250 to the center of the free layer 203; and a second portion 231 from the center of free layer 203 to shield 251. In FIG. 2a, the sensor current through portion 232 is shown schematically as aI while the sensor current through portion 231 is shown schematically as bI. Thus the sensor current is "I" and a+b=1.0.

By Ampere's law, the first portion of the sensor current aI produces a magnetic field within the free layer 203 in the +z direction while the second portion of the sensor current bI produces a magnetic field within the free layer 203 in the −z direction. However since the current aI flowing in region 232 is greater than the current bI flowing in region 231 (partially because the free layer 203 is not centered in the sensor structure 200), the field in +z direction (from aI) is larger than the field in the −z direction (from bI). FIG. 2b shows this schematically by indicating the sensor current bias $H_I$ is in the +z direction.

The MP2 layer 221 and MP1 layer 222 are, as discussed above, typically comprised of a ferromagnetic material such as CoFe or NiFe and are magnetized in opposite directions. This produces noticeable pole densities 221a,b 222a,b at the surfaces of these layers 221, 222 as seen in FIG. 2b. The pole densities 221a,b associated with the MP2 layer 221 produce a bias in the −z direction within free layer 203; while the pole densities 222a,b associated with the MP1 layer 222 produce a bias in the +z direction within free layer 203. Since the MP1 layer 222 is typically thicker than the MP2 layer 221, the bias on the free layer 203 from the MP1 layer 222 is stronger than the bias from the MP2 layer 221. FIG. 2b shows this schematically by indicating the pole density bias $H_{PD}$ from both the MP2 and MP1 layers 221, 222 is in the +z direction.

Another bias source relates to the discussion above concerning the sensor current aI+bI. Specifically, since shield structures 250, 251 are ferromagnetic, the sensor current aI+bI generates an associated image current 250a, 251a within these shield structures 250, 251. Note that the associated image currents 250a, 251a are not necessarily modeled as centered within each shield 250, 251. Thus, for simplicity, image currents 250, 251 are drawn in FIG. 2a to foster the conception of these currents rather than the precise manner in which they image the sensor current aI+bI.

The image currents 250a, 251a flow in the same direction as the sensor current (e.g., the +x direction of FIG. 2a). Since Ampere's law may be used with image currents, the image current 250a in shield 250 produces a bias in the +z direction while the image current 250b in shield 251 produces a bias in the −z direction. Since shield 251 is closer to the free layer 203 than shield 250, the image current 251a is stronger than the image current 250a. Thus, as seen in FIG. 2b, the overall bias from image currents 250a, 251a (reffered to as an image bias) is in the −z direction because the bias in the −z direction is stronger than the bias in the +z direction.

Another bias source is the magnetostatic coupling, also referred to as "orange peel" coupling, between the MP1 layer 222 and free layer 203. This bias, referred to as a coupling bias, acts in the direction of magnetization of the MP1 layer 222. As such, FIG. 2b shows this coupling bias $H_{CO}$ acting upon free layer in the −z direction. To summarize then, there are four sources of bias upon free layer 203 inherent in the sensor structure 200 of FIG. 2a: 1) a first source is the sensor current aI+bI; 2) a second source is the MP2 and MP1 layers 221, 222; 3) a third source is the image currents 250a, 251a; and 4) a fourth source is the magnetostatic coupling between the MP1 layer 222 and the free layer 203.

In order to produce a negligible bias (e.g., 1.0 Oerstead or less), the sensor current bias $H_I$, pole density bias $H_{PD}$, image current bias $H_i$ and coupling bias $H_{CO}$ produced by the four sources just described should produce an overall net sum of approximately zero. Thus, an approach to producing a balanced free layer 203 is to form the sensor structure 200 such that biases $H_I$ and $H_{PD}$ approximately cancel out biases $H_i$ and $H_{CO}$. That is, as provided in Equation 1 below:

$$|H_I|+|H_{PD}|\approx|H_i|+|H_{CO}| \qquad \text{Eqn.1}$$

In an embodiment, the sensor is tailored such that, approximately: $|H_I|=|H_i|$ and $|H_{PD}|=|H_{CO}|$. As just one example, $|H_{PD}|$ is approximately equal to $|H_{CO}|$ for a sensor structure having: 1) 54.0 Å of NiMnO as the gap layer 201; 2) 10.0 521 of Cu or CoFe as the seed layer 202; 3) 60.0 Å of IrMn as the AFM layer 205; 4) 10.0 Å of CoFe as the MP2 layer 221; 5) 8.0 Å of Ru between the MP2 and MP1 layers 221, 222; 6) 17.0 Å of CoFe as the MP1 layer 222; 7) 21.0 Å of Cu as the spacer layer 204; 8) a multilayer structure comprising 15.0 Å of CoFe and 45.0 Å of NiFe as free layer 203; 9) 20.0 Å of Ta as a cap layer 206; 10) 20 Å of $Al_2O_3$ as the isolation layer 207; and 11) 2000.00 Å of permalloy (NiFe) or Sendust (FeAlSi) as shields 250, 251; 1.

The thickness of the MP2 layer 221, the non magnetic layer 223, the MP1 layer 222 and the spacer layer 204 may be tailored to produce approximately equal $|H_{PD}|$ and $|H_{CO}|$. For example, in order to increase the component of $|H_{PD}|$ in the −z direction, the thickness of the MP2 layer 221 may be increased. Similarly, in order to increase the component of $|H_{PD}|$ in the +z direction, the thickness of the MP1 layer 222 may be increased. Note that $|H_{CO}|$ also increases with decreasing spacer layer 204 thickness.

The image current and sensor current biases may be generally expressed as provided below:

$$H_i \approx \frac{1}{2} J_1 \left( \frac{G2 - G1}{G1 + G2} \right) \quad \text{Eqn. 2}$$

$$H_I \approx J_2 \left( \frac{G2}{G1 + G2} \right) \quad \text{Eqn. 3}$$

Where $J_1$ is the sensor current density in the free layer 203 and $J_2$ is the combined sensor current density that exists in the spacer layer 204, MP1 layer 222, conductive layer 223, AFM layer 205, seed layer 202 and gap layer 201.

Figure 3:
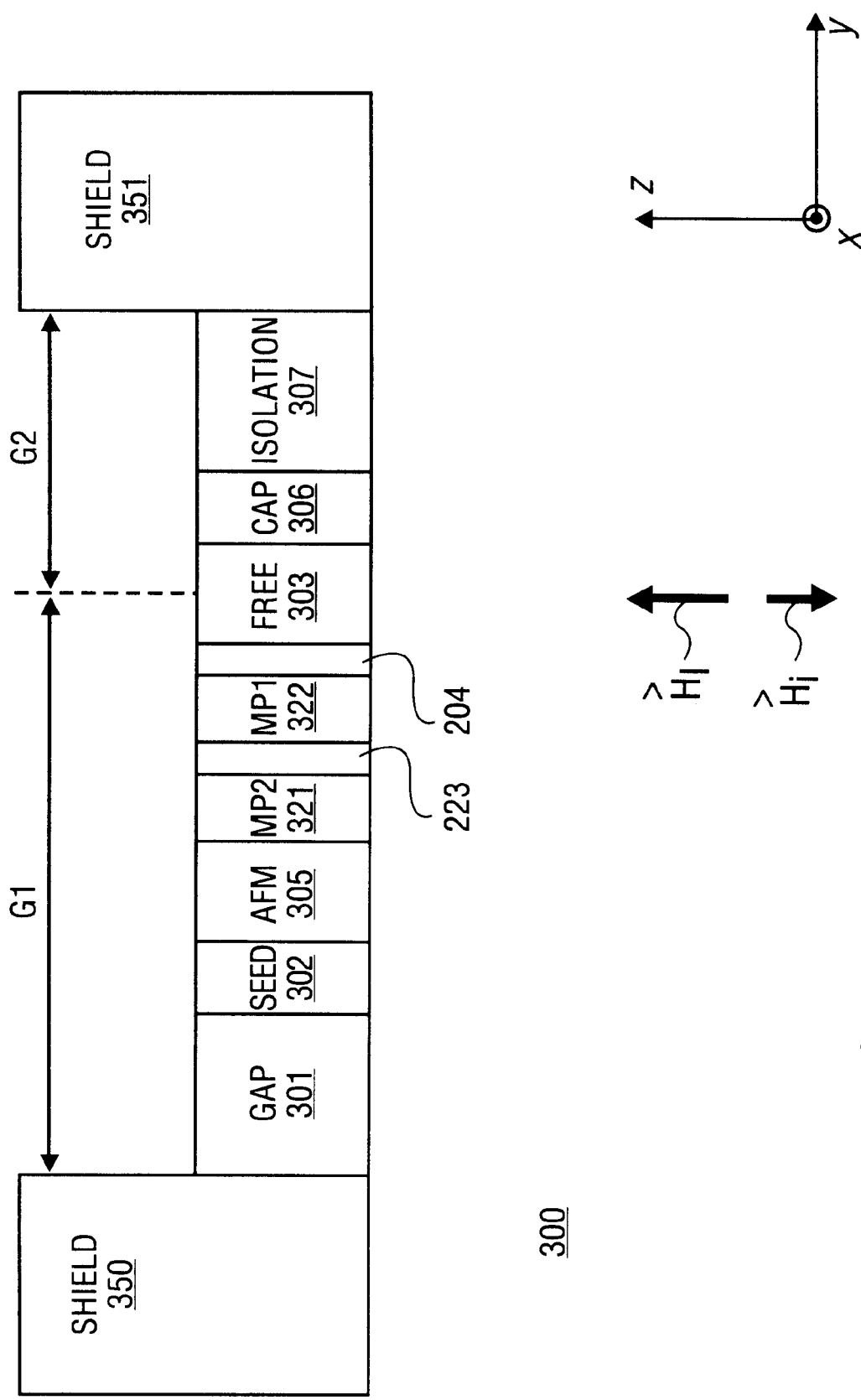
FIGS. 3 shows the AP pinned magnetic recording head sensor of FIG. 2b tailored to produce a canceled image charge current bias.

Referring to FIG. 3, in order to produce a sensor having approximately $|H_I|=|H_i|$ in an embodiment where the sensor is designed such that $J_1 \approx J_2$ the distance G1 from shield 350 to the center of free layer 303 should be about three times the distance G2 from the center of free layer 303 to shield 351. That is, using Equations 2 and 3 above, $H_I=-H_i$ if $J_1 \approx J_2$ and G1≈3G2. In alternate embodiments, G1 and G2 may be set to force $H_I=-H_i$ if $J_1$ is not approximately equal to $J_2$. Such embodiments may deviate from a G1≈3G2 design point.

Referring to the particular sensor structure listed above, note that G1=210 Å and G2=70 Å. This corresponds to a G1:G2 ratio of 3.0. Other embodiments may deviate from 3.0 as discussed. Note that as sensor 300 sizes continue to shrink, a relationship such as G1≈3G2 may force the isolation layer 307 material to be thin (e.g., 50 Å or less). Thin isolation layers 307 may be susceptible to "pin hole" shorts between the free layer 303 and shield 351. However, since isolation layer 307 is typically an oxide, the isolation layer may be formed as multilayer oxide structure where each layer corresponds to a discrete oxidation sequence undertaken during the formation of oxide layer 307. Note that the sensor structure of FIG. 3 is formed layer by layer in the +y direction. Hence, sensor layers at a higher y axis coordinate may be deemed "above" those layers located at a lesser y axis coordinate.

That is, for example, in a sensor 300 design that calls for an isolation layer of 30 Å, the isolation layer 307 may be formed with three discrete oxidation sequences: the first to a thickness of 10 Å, the second to a thickness of 20 Å and the third to a thickness of 30 Å. If after the first oxidation, pinholes exist in the first isolation layer oxide, the second or third oxidation sequences should cover and/or fill the pinholes.

Similarly, if pinholes exist in the second oxidation, the expectation is that they are above a region covered with oxide by the first oxide layer and will be filled and/or covered by the third oxidation layer. Lastly, pinholes in the third oxidation layer are likely to be above regions covered with oxide by the first and second layers. Thus, for any pin hole formed in any of the three layers, the expectation is that 20 Å of oxide still exists between the free layer 303 and shield 351.

Alternate embodiments may have structures for the cap 306 and isolation 307 layers other than a layer of tantulum (Ta) for the cap 306 and a layer of $Al_2O_3$ for the isolation layer 307. Various cap materials may be used besides Ta such as Ru. Furthermore, the cap layer 306 may be an oxide layer such as $Ta_2O_5$ to provide enhanced isolation beyond that provided by isolation layer 307. In other embodiments the cap and isolation layers 306, 307 may merge into a single layer. This single layer may be an oxide such as $Ta_2O_5$ or $Al_2O_3$ among others. The oxide layers mentioned above may also be formed as multilayer structures to prevent pinhole shorts.

In an embodiment, as discussed above, the sensor is designed such that $|H_I|$ is approximately equal to $|H_i|$. Other embodiments may still be constructed, however, where the sensor is deliberately designed such that $|H_I| \approx |H_i|$. In these embodiments, the thickness of the various sensor layers are tailored, in manners similar to those described above, to produce a difference between $|H_{PD}|$ and $|H_{CO}|$ (i.e., $|H_{PD}|$ does not cancel out $|H_{CO}|$) that approximately cancels out the difference between $|H_I|$ and $|H_i|$. That is, $|H_I|-|H_i|$ is approximately equal to $|H_{PD}|-|H_{CO}|$ so that the vector operation $H_I+H_{PD}+H_i+H_{CO} \approx 0.0$ is met.

Figure 4:
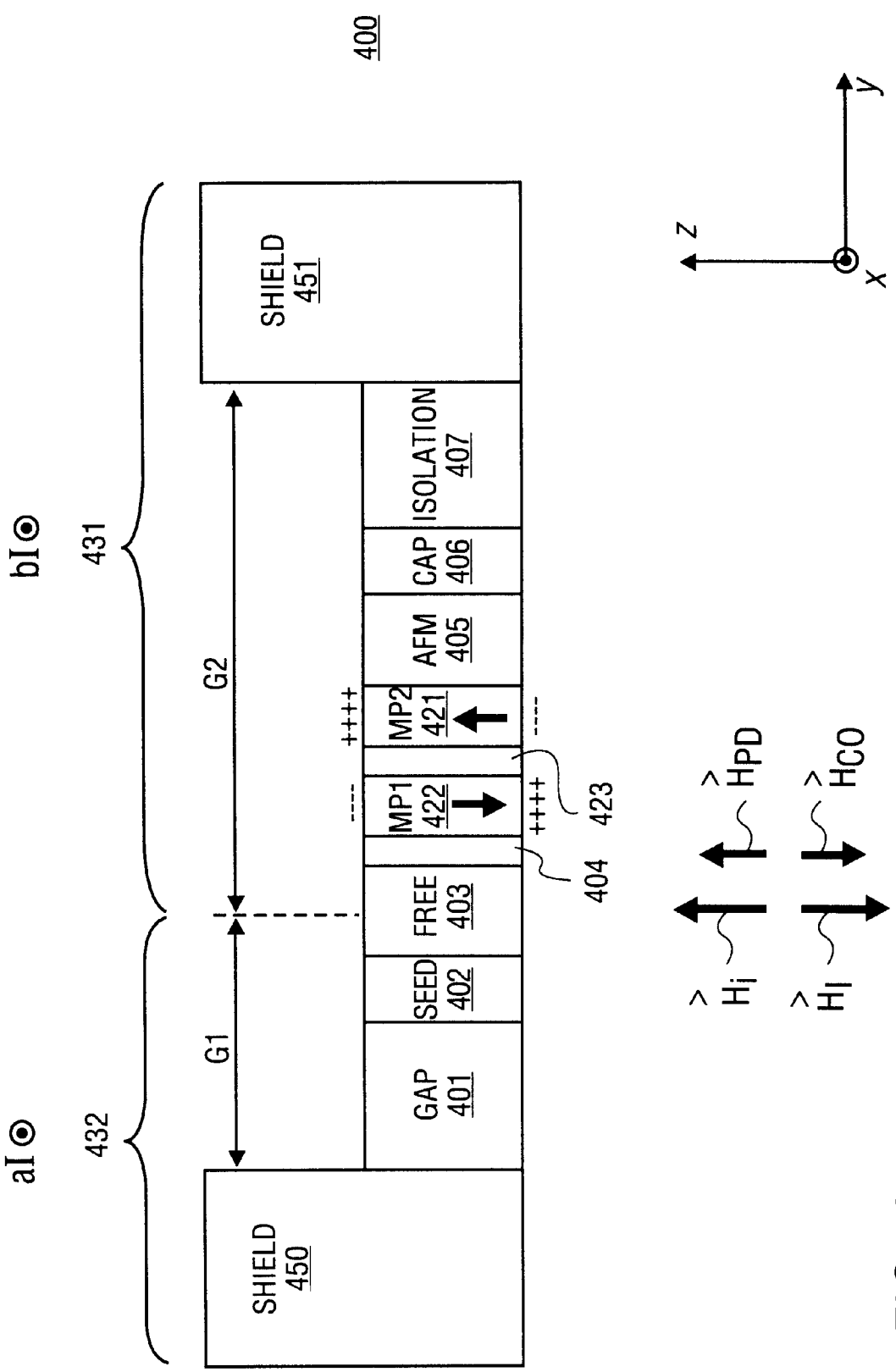
FIG. 4 shows a "top" AP pinned magnetic recording head having a canceled image charge current bias.

As mentioned above, the sensor structure 300 of FIG. 3 is formed layer by layer in the +y direction. Structures such as this may be referred to as "bottom" sensors since the AFM layer 305 is formed before the free layer 303 (i.e., near the bottom of overall sensor 300 while it is formed). FIG. 4 shows a sensor 400 commonly referred to as a "top" sensor; so called because the AFM layer 405 is formed after the free layer 403 (i.e., near the top of the overall sensor 400 as it is formed).

The discussion surrounding FIGS. 2a, 2b and 3 with regards to the bottom sensor 200, 300 are applicable to the top sensor 400 shown in FIG. 4. That is, the overall bias acting upon free layer 203 from biases $|H_I|$, $|H_{PD}|$, $|H_i|$, $|H_{CO}|$ is approximately zero. This may be accomplished by setting $|H_I|$ approximately equal to $|H_i|$ where 3G1≈G2 (in light of the same assumptions as described above). Note that, again, various sensor structures may force deviations from these approximations which may slightly alter this relationship between G1 and G2 for the top sensor 400. Also, the relationship between G1 and G2 needed to approximately cancel $|H_I|$ and $|H_i|$ may force a thin gap layer 401.

However, the gap layer 401 may in turn be formed to circumvent porosity problems by techniques such as multilayering as described above. Various bottom sensor 400 embodiments may also choose to produce a difference between $|H_{PD}|$ and $|H_{CO}|$ (i.e., $|H_{PD}|$ does not cancel out $|H_{CO}|$) that approximately cancels out a difference between $|H_I|$ and $|H_i|$. That is, $|H_I|-|H_i|$ is approximately equal to $|H_{PD}|-|H_{CO}|$ so that the vector operation $H_I+H_{PD}+H_i+H_{CO} \approx 0.0$ is met.

Referring to FIGS. 3 and 4, it is important to note that the gap layer 302, 402 may be comprised of other materials besides NiMnO such as, among others, $SiO_2$, AlN, and $Al_2O_3$. Furthermore, seed layer 302, 402 may be formed with magnetic materials such as a Co based alloy (e.g., CoFe) or non magnetic materials such as Copper (Cu). Note that if magnetic seed layers 302, 402 are used, the effect of its associated pole density and corresponding magnetic field (if any or if noticeable) on the biasing of the free layer 303, 403 may have to be accounted for in the design of the sensor 300, 400.

The AFM layers 305, 405 may be formed with materials other than IrMn such as PtMn or NiMn. Cu or Ru may be used for the non magnetic and spacer layers 323, 423, 304, 404. Note that consistent with the skills of those who practice in the art, embodiments employing CoFe and NiFe are not limited solely to $Co_{90}Fe_{10}$ and $Ni_{82}Fe_{18}$. That is, element percentages may vary consistent with the general formulations: $Co_xFe_{x-1}$ and $Ni_xFe_{x-1}$. This comment also applies to other compounds besides CoFe and NiFe as well.

Figure 5:
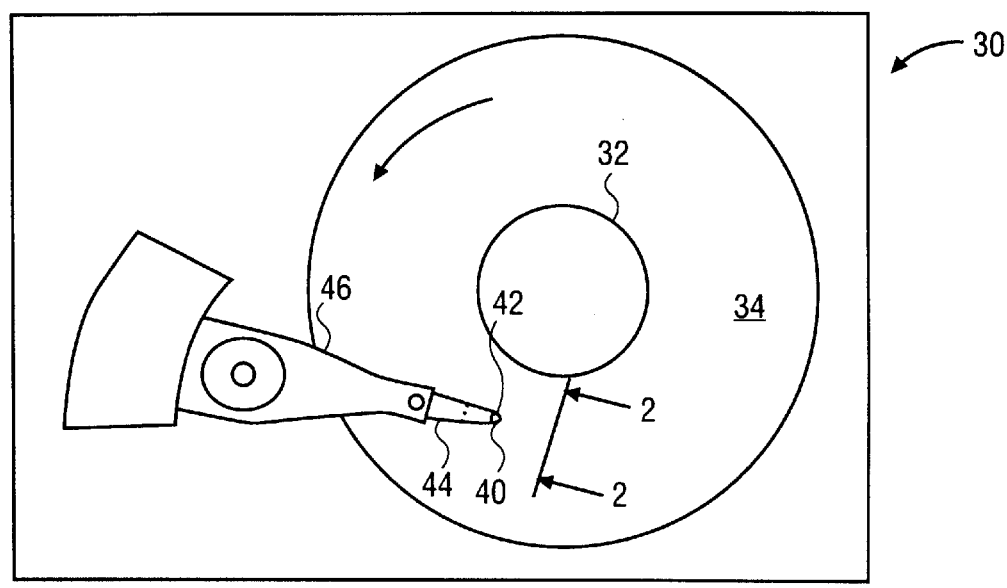
FIG. 5 shows a magnetic disk and activator.
Figure 6:
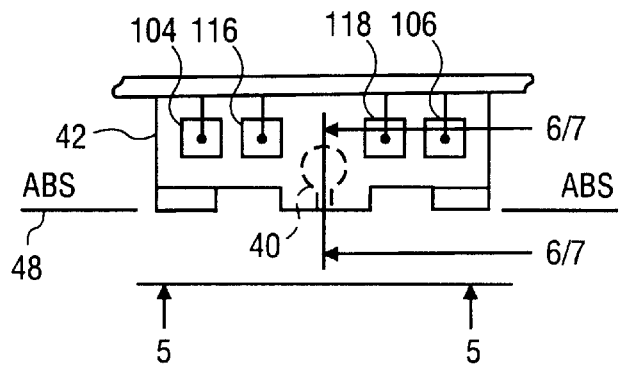
FIG. 6 shows an air bearing surface.
Figure 7:
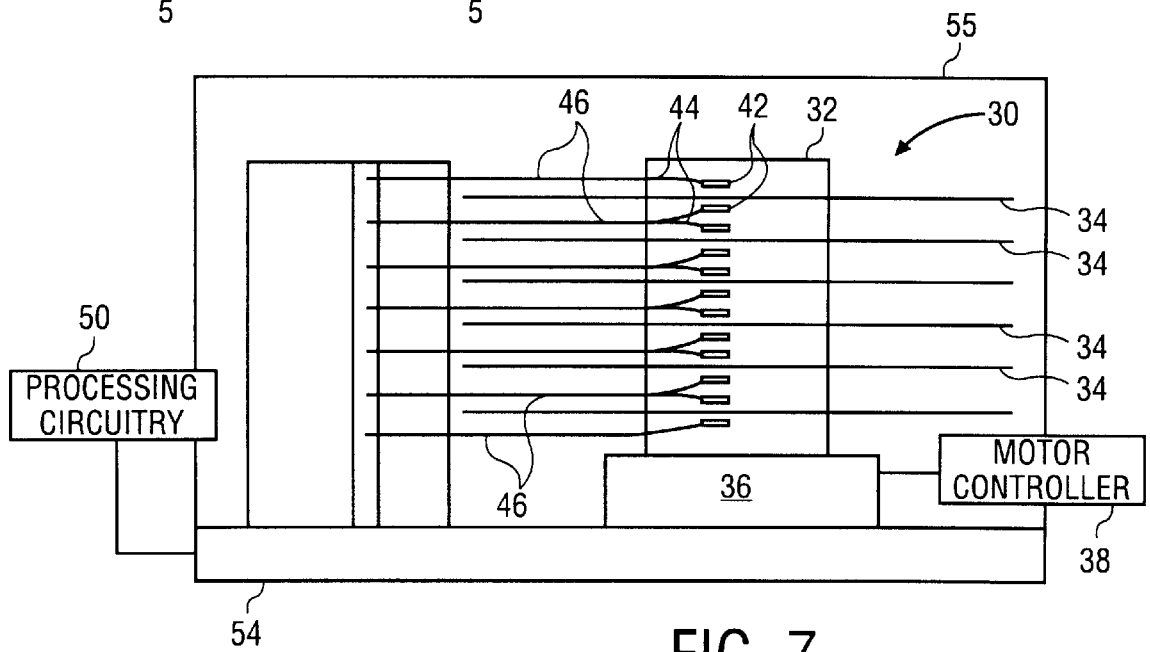
FIG. 7 shows a direct access storage device.

Referring now to the drawings wherein like reference numerals designate like or similar parts throughout the several views, FIGS. 5–7 illustrate a magnetic disk drive 30. The drive 30 includes a spindle 32 that supports and rotates a magnetic disk 34. The spindle 32 is rotated by a motor 36 that is controlled by a motor controller 38. A slider 42 with a combined read and write magnetic head 40 is supported by a suspension 44 and actuator arm 46. A plurality of disks, sliders and suspensions may be employed in a large capacity direct access storage device (DASD) as shown in FIG. 7. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks.

What is claimed is:

1. An apparatus, comprising:
   a) a free layer;
   b) a spacer layer between a first magnetic layer and said free layer, said spacer layer and said first magnetic layer tailored to produce a coupling bias on said free layer;
   c) a conductive layer between a second magnetic layer and said first magnetic layer; said first and second magnetic layers magnetized antiparallel with respect to each other, said first and second magnetic layers and said spacer and said conductive layers tailored to produce a pole density bias on said free layer; and
   d) a pair of shields, said free layer located at a position between said shields such that an image bias and a sensor current bias, in summation with said coupling bias and said pole density bias, produce negligible bias on the magnetization direction of said free layer.

2. The apparatus of claim 1 wherein said position of said free layer is such that said image bias cancels said sensor current bias.

3. The apparatus of claim 2 wherein the distance between said position and a first shield of said pair of shields is three times the distance between said position and a second shield of said pair of shields.

4. The apparatus of claim 1 wherein said apparatus corresponds to a bottom sensor.

5. The apparatus of claim 4 wherein said bottom sensor further comprises an isolation layer between said free layer and one of said shields, said isolation layer comprising a multilayered oxide.

6. The apparatus of claim 5 wherein said isolation layer comprises NiMnO.

7. The apparatus of claim 5 wherein said isolation layer comprises $Al_2O_3$.

8. The apparatus of claim 1 wherein said apparatus corresponds to a top sensor.

9. The apparatus of claim 8 wherein said top sensor further comprises a gap layer between said second magnetic layer and one of said shields, said gap layer comprising a multilayered oxide.

10. The apparatus of claim 9 wherein said gap layer comprises NiMnO.

11. The apparatus of claim 9 wherein said gap layer comprises $Al_2O_3$.

12. An apparatus, comprising:
   a) a magnetic disk;
   b) a magnetic head configured to be placed over said magnetic disk; said magnetic head comprising a free layer, a spacer layer between a first magnetic layer and said free layer, said spacer layer and said first magnetic layer tailored to produce a coupling bias on said free layer a conductive layer between a second magnetic layer and said first magnetic layer, said first and second magnetic layers magnetized antiparallel with respect to each other, said first and second magnetic layers and said spacer and said conductive layers tailored to produce a pole density bias on said free layer, and,
   c) a pair of shields, said free layer located at a position between said shields such that an image bias and a sensor current bias, in summation with said coupling bias and said pole density bias, produce negligible bias on the magnetization direction of said free layer.

13. The apparatus of claim 12 wherein said position of said free layer is such that said image bias cancels said sensor current bias.

14. The apparatus of claim 13 wherein the distance between said position and a first shield of said pair of shields is three times the distance between said position and a second shield of said pair of shields.

15. The apparatus of claim 12 wherein said apparatus corresponds to a bottom sensor.

16. The apparatus of claim 15 wherein said bottom sensor further comprises an isolation layer between said free layer and one of said shields, said isolation layer comprising a multilayered oxide.

17. The apparatus of claim 16 wherein said isolation layer comprises $Ta_2O_5$.

18. The apparatus of claim 16 wherein said isolation layer comprises $Al_2O_3$.

19. The apparatus of claim 12 wherein said apparatus corresponds to a top sensor.

20. The apparatus of claim 19 wherein said top sensor further comprises a gap layer between said second magnetic layer and one of said shields, said gap layer comprising a multilayered oxide.

21. The apparatus of claim 20 wherein said gap layer comprises $Ta_2O_5$.

22. The apparatus of claim 20 wherein said gap layer comprises $Al_2O_3$.

* * * * *